United States Patent Office 2,938,849
Patented May 31, 1960

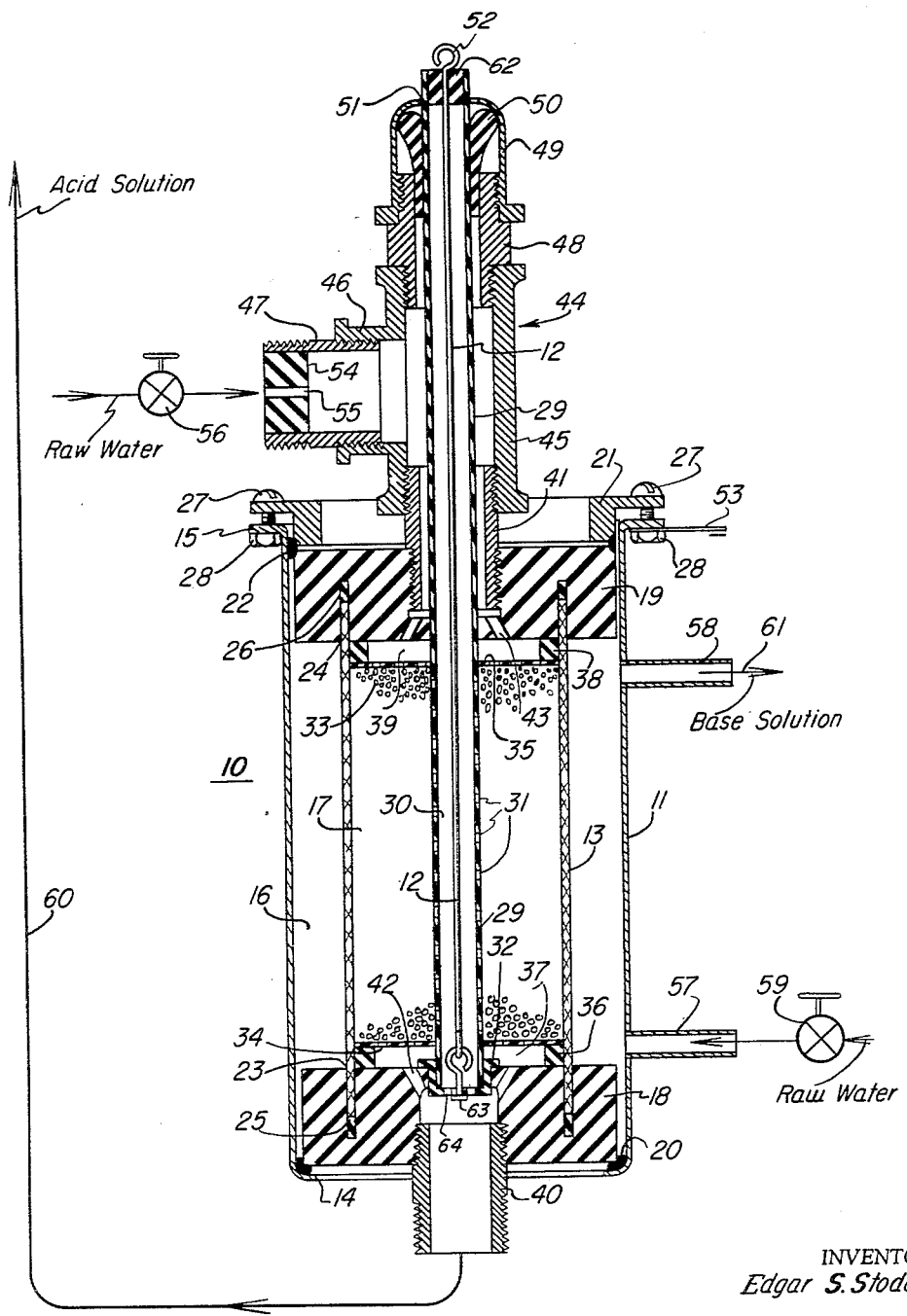

2,938,849

ELECTROLYTIC WATER TREATMENT UNIT

Edgar S. Stoddard, Oak Park, Ill., assignor to General Electric Company, a corporation of New York Filed May 13, 1958, Ser. No. 734,971

8 Claims. (Cl. 204—263)

The present invention relates to water treatment units, and more particularly to such units that are especially designed to convert raw water containing dissolved mineral salts into corresponding aqueous acid and base solutions. This application is a continuation-in-part of the copending application of Edgar S. Stoddard, Serial No. 507,805, filed May 12, 1955, now Patent No. 2,825,666, granted March 4, 1958.

It is the general object of the invention to provide improved apparatus for treating ordinary hard water for the purpose of producing separate and distinct aqueous acid and base solutions therefrom.

Another object of the invention is to provide a water treatment unit of the character noted that is of improved and simplified construction and arrangement.

A further object of the invention is to provide a water treatment unit of the character noted that incorporates facilities for carrying out both ion exchange and electrodialysis.

A still further object of the invention is to provide a water treatment unit that is operative to produce separate aqueous acid and base solutions in a ready and simple manner from ordinary hard water without attention on the part of the operator; whereby the unit may be incorporated in a dishwasher or other appliance.

Further features of the invention pertain to the particular arrangement of the element of the water treatment unit; whereby the above-outlined and additional operating features thereof are attained.

The invention, both as to its organization and method of operation, together with further objects and advantages thereof, will best be understood by reference to the following specification, taken in connection with the accompanying drawing, in which:

The single figure is a vertical sectional view of a water treating unit embodying the present invention.

Referring to the drawing, the water treatment unit 10 there illustrated and embodying the features of the present invention comprises an upstanding substantially cylindrical outer tubular casing 11 formed of stainless steel and constituting a cathode, an upstanding substantially wire-like member 12 formed of metal and constituting an anode, an upstanding substantially cylindrical tubular permeable diaphragm or barrier 13 formed of ceramic material, and an upstanding substantially cylindrical tubular insulating sleeve 29 formed of phenol-formaldehyde condensation products.

In the arrangement, the barrier 13 is disposed within the cathode 11 and spaced substantially concentrically inwardly therefrom, the sleeve 29 is disposed within the barrier 13 and spaced substantially concentrically inwardly therefrom, and the anode 12 is disposed substantially centrally within the sleeve 29 and spaced therefrom. The lower end of the cathode 11 is provided with an inwardly directed annular flange 14 and the upper end of the cathode 11 is provided with an outwardly directed annular flange 15. The cathode 11 cooperates with the barrier 13 to define a substantially annular cathode chamber 16 therebetween, the barrier 13 cooperates with the sleeve 29 to define a substantially annular treatment chamber 17 therebetween, and the sleeve 29 cooperates with the anode 12 to define a substantially annular anode chamber 30 therebetween.

The opposite lower and upper ends of the cathode 11 are closed by a pair of longitudinally spaced-apart substantially disk-like insulating plates 18 and 19. The lower plate 18 is supported on the lower flange 14 with an annular sealing gasket 20 arranged therebetween; and the upper plate 19 is secured in place by an associated clamping ring 21 disposed thereabove, an annular sealing gasket 22 being arranged mutually between the upper plate 19, the clamping ring 21 and the adjacent upper end wall of the cathode 11. More particularly, the barrier 13 is clamped in position between the plates 18 and 19 by the arrangement including the clamping ring 21, the upper face of the lower plate 18 having an annular groove 23 therein receiving the adjacent lower end of the barrier 13, and the lower face of the upper plate 19 having an annular grove 24 therein receiving the adjacent upper end of the barrier 13. In the arrangement, two sealing gaskets 25 and 26 are respectively positioned in the grooves 23 and 24 and respectively engage the lower and upper ends of the barrier 13, thereby to form a liquid-tight seal between the cathode chamber 16 and the treatment chamber 17. The clamping ring 21 may be secured in place to the adjacent annular flange 15 disposed therebelow by a plurality of screws 27 provided with associated nuts 28 in order to complete the assembly. In the arrangement, the plates 18 and 19 may be formed of phenol-formaldehyde condensation products; the gaskets 20, 22, 25 and 26 may be formed of neoprene; and the clamping ring 21 may be formed of any suitable material.

The upper portion of the sleeve 29 extends through a central opening provided in the upper plate 19 to the exterior and well above the upper plate 19, while the extreme lower end of the sleeve 29 is received by a substantially cup-shaped member 32 arranged in a central opening provided in the lower plate 18. The upper portion of the sleeve 29 disposed exteriorly of the upper plate 19 is imperforate, while the lower portion of the sleeve 29 disposed between the chambers 17 and 30 is perforated, as indicated at 31, so as to place the chambers 17 and 30 in full communication with each other between the lower and upper plates 18 and 19. The extreme upper end of the sleeve 29 is closed by a stopper 62 through which the upper end of the wire-like anode 12 extends to provide an exteriorly arranged terminal 52 on the extreme upper end thereof. The extreme lower end of the wire-like anode 12 is anchored in place upon the end wall of the insulating cup 32 by a substantially hook-like fixture 63 carried thereby. In the arrangement, the cup 32 and the plug 62 may be formed also of phenol-formaldehyde condensation products; and preferably the wire-like anode 12 is cemented in place in a centrally disposed opening provided through the plug 62.

Also an ion exchange bed, indicated at 33, is arranged within the treatment chamber 17 between the barrier 13 and the sleeve 29. In order clearly to define the bed 33 and to retain the same in place, a pair of longitudinally spaced-apart substantially disk-like reticulated plates or screens 34 and 35 are respectively arranged in the lower and upper portions of the treatment chamber 17 within the barrier 13 and in surrounding relation with respect to the sleeve 29; the lower plate 34 is spaced somewhat above the lower plate 18 by an interposing spacing ring 36 to define an annular space 37 therebetween; and likewise, the upper plate 35 is spaced somewhat below the upper plate 19 by an interposing spacing ring 38 to define an annular space 39 therebetween. In the arrangement, the plates 34 and 35, as well as the spacing rings 36 and 38, may be formed of phenol-formaldehyde condensation products. Preferably the porous bed 33 completely fills the space within the treatment chamber 17 defined mutually between the barrier 13 and the sleeve 29 and the lower and upper plates 34 and 35; the plates 34 and 35 being perforated to accommodate the passage of a stream of water undergoing treatment therethrough.

The outer ends of the central openings formed in the plates 18 and 19 are threaded and respectively receive the threaded ends of lower and upper tubular elements 40 and 41 respectively arranged in liquid-tight relation therewith. An annular array of holes 42 is provided in the lower plate 18 and communicating between the upper end of the tubular element 40 and the adjacent annular space 37; and likewise, an annular array of holes 43 is provided in the upper plate 19 and communicating between the lower end of the tubular element 41 and the adjacent annular space 39. Further, an annular array of holes 64 is formed in the end wall of the cup 32 and communicating between the lower portion of the anode chamber 30 and the upper end of the tubular member 40. The extreme lower end of the tubular member 40 is threaded in order to receive any desired connecting fitting; and likewise, the extreme upper end of the tubular member 41 is threaded and carries a substantially T-shaped fitting 44 having a longitudinally extending hollow head 45 surrounding the sleeve 29 through which the anode 12 extends and a laterally extending stem 46 receiving the threaded inner end of a tubular member 47, the outer end of the tubular member 47 being threaded to receive any desired connecting fitting. The upper end of the head 45 is threaded and receives the lower end of a longitudinally extending tubular member 48 also surrounding the sleeve 29; while the upper end of the tubular member 48 is threaded and receives an inverted substantially cup-shaped fitting 49 also surrounding the sleeve 29. A substantially sleeve-like compressible sealing gasket 50, that may be formed of neoprene, is arranged within the upper end of the tubular member 48 and within the fitting 49 in surrounding relation with the sleeve 29 and retained in compression by the fitting 49 in order to provide a liquid-tight joint or gland closing the upper end of the tubular member 48 and sealing the same with respect to the exterior. The extreme upper end of the sleeve 29 projects through a central opening 51 provided in the fitting 49 to the exterior; and the extreme upper end of the anode 12 projects beyond the extreme upper end of the sleeve 29 and to the exterior through the plug 62, as previously noted. In the arrangement, the terminal or fixture 52 that is disposed exteriorly of the plug 62 is adapted to be connected to the ungrounded positive terminal of a direct current source of supply; and a terminal strip 53 is secured to the cathode 11 and is adapted to be connected to the grounded negative terminal of the direct current source of supply mentioned.

Further, the unit 10 is provided with a flow control device that may take the form of a plug 54 arranged in the outer end of the tubular member 47 and having a centrally disposed opening 55 formed therethrough; the body of the plug 54 being formed of resilient material, such, for example, as neoprene so that the configuration thereof may be somewhat distorted in response to an abnormal pressure in the associated inlet supply connection, not shown, so as to reduce the effective cross-sectional area of the hole 55 therethrough with the contracting flow-regulating effect with respect to the passage of water into the fitting 44. In other words, the flow control plug 54 is defined to accommodate the passage through the hole 55 of a substantially fixed flow of water when the tubular member 47 is connected to household plumbing involving the usual water pressures encountered therein, a conventional manually operable valve 56 being arranged in the plumbing connection mentioned preceding the tubular member 47. Two conduits 57 and 58 are respectively secured in liquid-tight relation with lower and upper openings provided in the wall of the cathode 11 and communicating with the respective lower and upper ends of the cathode chamber 16, the conduit 57 being connected to the household plumbing and including a manually operable valve 59. The tubular element 40 is connected to upstanding conduit structure 60 to which the acid solution is supplied from the treatment chamber 17 and the anode chamber 30; and the conduit 58 is connected to conduit structure 61 to which the base solution is supplied from the cathode chamber 16. In the arrangement, the conduit structure 60 is disposed in upstanding relation and extends above the treatment chamber 17 so as to insure that the porous ion exchange bed 33 is saturated at all times with the acid solution in the treatment chamber 17.

In the operation of the unit 10, when the valve 56 occupies its open position, a controlled flow of water into the tubular member 47 is effected by the flow control plug 54, which water then proceeds downwardly between the sleeve 29 and the element 41 and thence downwardly through the treatment chamber 17 into the member 40 and also from the treatment chamber 17 through the perforations 31 in the sleeve 29 and downwardly in the anode chamber 30 in washing relation with the anode 12 and thence into the member 40. An acid solution is produced in the chambers 17 and 30 and this solution proceeds from the member 40 upwardly through the conduit structure 60 to the exterior. Similarly, when the valve 59 occupies its open position, water flows through the conduit 57 upwardly through the cathode chamber 16 so that a base solution is produced that flows out of the conduit 58 to the exterior into the conduit structure 61. Accordingly, the stream of water flowing downwardly through the chambers 17 and 30 is in counterflow relation with respect to the water flowing upwardly through the cathode chamber 16. The stream of water flowing through the treatment chamber 17 readily penetrates the porous ion exchange bed 33 therein and is in wetting relation therewith and with the barrier 13; and also the water from the chamber 17 proceeds through the perforations 31 in the sleeve 29 into the anode chamber 30 and thus into washing relation with the anode 12, as previously noted. Similarly, the stream of water flowing through the cathode chamber 16 is in wetting relation with the barrier 13 and the cathode 11. As explained more fully hereinafter, the stream of water flowing through the treatment chamber 17 and the anode chamber 30 constitutes an anolyte that is an aqueous acid solution, while the stream of water flowing through the cathode chamber 16 constitutes a catholyte that is an aqueous base solution.

The elements 44, etc. are also connected to ground potential; and the ungrounded anode 12 is completely electrically insulated from the grounded cathode 11 and from the elements 44, etc.; whereby the application of positive potential between the anode 12 and the cathode 11 effects an electrolytic action upon the two streams of water respectively traversing the chamber 16 and the chambers 17 and 30 and also upon the ion exchange bed 33.

Turning now to the composition of the ion exchange bed 33, it preferably comprises a body of ion retardation resin, such, for example, as the bead-like product sold under the tradename "Retardion 11A8." This resin contains both cationic and anionic adsorption sites; whereby it will adsorb both cations and anions from the solutions in which it comes in contact. This resin is prepared by polymerizing an anionic monomer inside the pores of an anion exchange resin (or a cationic monomer inside the pores of a cationic exchange resin). The resulting polymer is trapped inside the cross-linked ion exchange resin and cannot diffuse out. This resin system is physically and chemically stable, and comprises a mixture of cation and anion exchangers with the mixture taking place at the molecular level.

Alternatively, the resin bed 33 may comprise a mixture of first discrete particles of a synthetic organic polymeric cation exchange resin and of second discrete particles of a synthetic organic polymeric anion exchange resin, the two types of particles being mixed to provide approximately equal cation exchange and anion exchange capacities. In this case, the cation exchange resin is of bead-like formation and may comprise the strong-acid resin sold under the name "Amberlite IR-120," and the anion exchange resin is of bead-like formation and may comprise the strong-base resin sold under the names "Amberlite IRA-400" and "Amberlite IRA-410."

As a constructional example of the unit 10, expressly designed for use in dishwashing apparatus of the home appliance type, the internal diameter of the cathode may be 3⅞"; the internal diameter of the barrier 13 may be 2¾"; the internal diameter of the sleeve 29 may be ⅜"; the diameter of the anode wire 12 may be 0.010"; the distance between the adjacent upper and lower surfaces of the plates 18 and 19 may be 6¾"; the other dimensions may be appropriately related; and the volume of the bed 33 may be 0.02 cubic foot. Preferably the anode 12 comprises a brass, copper or other base metal wire that carries a noble metal coating on the exterior surface thereof and having a thickness of about 0.001". For example, the outer coating of the anode 12 may comprise platinum, palladium, or the like, suitably bonded to the base metal core thereof so as to provide a suitable anode that is not subject to erosion or chemical attack when the electrolytic current is conducted between the anode 12 and the cathode 11.

It is contemplated that this constructional example of the unit 10 will be incorporated in dishwashing apparatus, as disclosed in the previously mentioned Stoddard application; whereby the water is conducted through the treatment compartment 17 and the anode compartment 30 in a single demand and involving a time interval of about thirty seconds; whereby the flow control plug 54 may be constructed and arranged to accommodate the passage therethrough of three gallons per minute, thereby accommodating the passage of six quarts of anolyte through the unit 10 in each cycle of operation of the dishwashing apparatus mentioned. On the other hand, the flow of the catholyte through the unit 10 may be continuous and at the exceedingly low rate of about twelve gallons per month. In this case, the direct current may be conducted from the anode 12 to the cathode 31 continuously at about 0.1 ampere by impressing a direct voltage between the anode 12 and the cathode 11 of about 7-volts; whereby the energy requirement of the unit 10 may have an average value of about 0.5 kilowatt-hour per month, this value being somewhat variable and dependent upon the character of the hard water being treated.

Turning now more particularly to the treatment of water in the unit 10, it is first noted that ordinary hard water contains dissolved metal salts, particularly salts of alkali earth metals, which electrolytes include such cations as: $Ca^{++}$, $Mg^{++}$, $Na^+$, $Fe^{++}$, etc., and such anions as: $Cl^-$, $HCO_3^-$, $CO_3^{--}$, $SO_4^{--}$, $NO_3^-$, etc. Hard water to be treated frequently contains a dissolved solids count of 250 p.p.m. and higher, comprising dissolved electrolytes yielding the cations and the anions named; whereby it is totally unsuitable for use in the dishwashing apparatus mentioned for several reasons. In the first place, certain of these cations particularly $Ca^{++}$, form precipitates with ordinary detergents and also with many food soils introduced into the dishwasher on the dishes; whereby the resulting solids are deposited upon the dishes producing undesirable films, stains, etc. Moreover, incident to drying of the dishes, the evaporation of the water films thereon causes the deposit of metal salts thereon, as it is apparent that when the solvent is evaporated the concentration of the cations and anions therein exceeds the solubility of the corresponding salts; whereby $CaCO_3$, for example, is deposited upon the dishes producing corresponding scale thereon. Now in the practical demineralization of hard water, it is not necessary to remove all of the dissolved solids but only to reduce the total dissolved solids to a tolerable value. For example, Chicago city water is only moderately hard containing about 135 p.p.m. of hardness ions (calculated as $CaCO_3$) and can be rendered altogether soft from a practical standpoint, by reducing the content of these hardness ions to 35 p.p.m. Restating the matter in terms of grains of hardness, Chicago city water is of 8 grains hardness; whereby the volume of the ion exchange bed 33 has a capacity for softening 87.5 gallons of Chicago city water, since this volume of the bed 34 has an absolute capacity of reacting with 700 grains of water hardness. Now during the long time interval when no anolyte is conducted through the unit 10, the continuous passage of the direct electric current between the anode 12 and the cathode 11 effects regeneration of the resin incorporated in the bed 33, and it may be readily calculated that this regeneration is at least 10% of that of the total capacity of the bed 33; whereby it is apparent that the unit 10 is regenerated to accommodate the softening of 8.75 gallons of Chicago city water per day. Now even if the dishwashing apparatus mentioned were installed in an area having exceedingly hard water, such, for example, as a few areas having a water hardness as high as 25 grains, the regeneration capacity of the unit 10 is then reduced to only 2.9 gallons per day. However, the conduction of even this volume of anolyte through the anode chamber 17 of the unit 10 is not required in the cycle of the dishwashing apparatus mentioned.

In the above discussion, only the demineralization or softening of hard water has been referred to, but it will be understood that the electrolysis that proceeds in the unit 10 is effective moderately to reduce the pH of the anolyte and substantially to increase the pH of the catholyte; whereby the reduction in the pH of the anolyte serves another very important function in the operation of the dishwashing apparatus mentioned in that the rinse water involved in the automatic cycle thereof, being thoroughly acidified, is capable of dissolving previously deposited metal salts from the dishes undergoing the dishwashing operation, as it is apparent that the solubility of the metal salts is substantially increased as the pH of the final rinse solution is reduced with respect to neutrality. Thus this effect that is achieved in the dishwashing apparatus mentioned is most beneficial in obtaining a satisfactory appearance of the dishes at the conclusion of the washing cycle.

The foregoing considerations will be understood in conjunction with a brief description of the electrodialysis that occurs in the unit 10. More particularly, the cations of the electrolytes dissolved in the anolyte are transported by diffusion through the permeable barrier 13 into the catholyte by virtue of the attraction between the positive electrical charges and the cathode 11; and conversely, the anions of the electrolytes dissolved in the catholyte are transported by diffusion through the permeable barrier 13 into the anolyte by virtue of the attraction between the negative electrical charges and the anode 12. Thus the cations are preferentially extracted from the anolyte and accumulated in the catholyte, and the anions are preferentially extracted from the catholyte and accumulated in the anolyte. Of course, the extraction of cations from the anolyte, as well as the accumulation of anions therein, effects an increase in the hydrogen ion concentration in the anolyte; whereby the pH of this aqueous solution is correspondingly reduced and may be disposed within the range 4.0 to 5.0, in the operation of the unit 10; and conversely, the extraction of the anions from the catholyte, as well as the accumulation of cations therein, effects a decrease in the hydrogen ion concentration in the catholyte; whereby the pH of this aqueous solution is correspondingly increased and may be disposed within the range 9.0 to 10.0, in the operation of the unit 10. Of course, some oxygen is evolved at the anode 12 that is swept along with the anolyte through the tubular member 40; while some hydrogen is evolved at the cathode 11 that is swept along with the catholyte through the conduit 58.

During the conduction of the water through the bed 33 substantial amounts of the cations and the anions of the electrolytes dissolved in the raw water are respectively exchanged with hydrogen ions and hydroxyl ions respectively by the cation exchange sites in the resin and by the anion exchange sites in the resin, thereby correspondingly depleting respectively the cation exchange capacity of the resin and the anion exchange capacity of the resin. However, when the valve 56 in the supply line communicating with the treatment chamber 17 and the anode chamber 30 is subsequently closed, the cation exchange sites in the resin and the anion exchange sites in the resin undergo partial regeneration, since the conduction of the direct current from the anode 12 to the cathode 11 is continuous. Specifically, the cation exchange sites in the resin are regenerated by the release of the cations of the previously exchanged metal salts and by the recapture of hydrogen ions from the anolyte, which released cations diffuse through the permeable barrier 13 into the continuously flowing catholyte and are transported to the exterior of the unit 10 as previously explained. Similarly, the anion exchange sites in the resin are regenerated by the release of the anions of the previously exchanged metal salts and by the recapture of hydroxyl ions from the anolyte, which anions migrate through the perforated sleeve 29 and accumulate in the anolyte in the anode chamber 30 with the ultimate formation of oxygen molecules dispersed therethrough.

The arrangement of the ion retardation resin bed 33 in the treatment chamber 17 is very advantageous as it materially reduces the internal resistance of the unit 10 between the anode 12 and the cathode 11 greatly facilitating the migration of both the cations and the anions through the permeable barrier 13, whereby the heating of the anolyte and the catholyte passing through the unit 10 is greatly minimized thereby drastically reducing the energy requirements thereof. Moreover, the provision of the resin bed 33 permits a substantial reduction in the size of the unit 10 as it in effect permits of the accumulation or storage of ion exchange capacity during the extremely long time interval during which the anolyte is not actively conducted through the treatment chamber 17 and the anode chamber 30. In this connection, it is noted that the continuous conduction of the catholyte through the cathode chamber 16 is very important as the arrangement insures that the ion exchange bed 33 remains wet at all times and in readiness to effect the required ion exchange when the anolyte is conducted through the treatment chamber 17 and the anode chamber 30 during the short time interval of a demand upon the unit 10. In other words, it is important that the ion exchange bed 33 be flooded with water at all times so that it is in readiness to perform the required ion exchange function at all times.

Recapitulating, in conjunction with the operation of the unit 10: the raw Chicago city water in the supply pipe connected to the member 47 may contain eight grains of hardness and have a pH of 7.0; whereas the anolyte that is conducted from the member 40 and employed in the automatic cycle of the dishwashing apparatus mentioned may contain about two grains of hardness and have a pH within the approximate range 4.0 to 5.0. In passing, it is noted that the catholyte that is conducted through the cathode chamber 16 is flushed into the drain plumbing of the dishwashing apparatus mentioned, as such is useful to bring about the saponification of the higher fatty acids of animal and vegetable origin that tend to collect and cake therein, since the catholyte has a pH well in the base range as previously noted. The raw water that is supplied into the treatment chamber 17 and the anode chamber 30 may have a pressure of about 25 p.s.i., and the flow control plug 54 accommodates the flow therethrough at a rate of about twelve quarts per minute; while the raw water that is supplied via the valve 59 into the cathode chamber 16 flows at an exceedingly small rate of about twelve gallons per month. Accordingly, the total quantities and the flow rates of the water through the respective cathode chamber 16 and the anode chamber 30 are altogether disproportional in the normal operation of the dishwashing apparatus mentioned. Specifically, the catholyte is conducted continuously through the cathode chamber 16 in a total quantity of about twelve gallons in a period of one month, or thirty days; whereas the anolyte is conducted intermittently through the treatment chamber 17 and the anode chamber 30, about once per day, or thirty times per month, and in the total quantity of about ninety gallons in the period of one month, or thirty days. Thus the conduction of the catholyte is at a rate of about $2.8 \times 10^{-4}$ gal. per minute, while the conduction of the anolyte is at a rate of about 3.0 gallons per minute; whereby the rate of flow of the anolyte is about 10,000 times as great as the rate of flow of the catholyte. However, the arrangement is entirely feasible, since the flow of the anolyte at its relatively high rate occurs only for about one minute in each twenty-four hour period; whereas the flow of the catholyte at its exceedingly low rate occurs continuously. The ion exchange bed 33 has a high rate of expenditure of its accumulated capacity to exchange ions; and the ion exchange bed 33 is under continuous regeneration at the low rate involving the continuous conduction therethrough of the direct electric current of about 0.1 ampere.

Finally, it is pointed out in conjunction with the operation of the unit 10 that it may be arranged either preceding or following a hot water heater, whereby the raw water supplied thereto may be at the ambient temperature of about 50° F., or at the elevated temperature of about 160° F., in the respective locations noted. In this connection, it is mentioned that the ion exchange capacity of the bed 33 is substantially increased when hot water is conducted therethrough.

While the construction and utilization of the unit 10 have been described in conjunction with dishwashing apparatus because of the divisional character of the present application, it will be understood that it is of general utility for the production from ordinary hard water of separate and distinct aqueous acid and base solutions of the character specified that may be employed for other purposes.

In view of the foregoing, it is apparent that there has been provided an improved apparatus for producing separate and distinct aqueous acid and base solutions from ordinary hard water that is particularly useful in conjunction with dishwashing apparatus, or the like.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electrolytic cell comprising an elongated substantially cylindrical hollow cathode, an elongated substantially cylindrical hollow permeable diaphragm arranged substantially concentrically within said cathode in spaced relation therewith, an elongated anode arranged substantially concentrically within said diaphragm in spaced relation therewith, a pair of longitudinally spaced-apart substantially disk-like insulating heads respectively cooperating with the opposite ends of said diaphragm and said cathode and said anode to define a liquid-tight substantially annular catholyte chamber between said diaphragm and said cathode and a liquid-tight substantially annular anolyte chamber between said diaphragm and said anode, inlet and outlet conduits communicating with said catholyte chamber adjacent to the opposite ends thereof and accommodating the conduction therethrough and into contact with both said cathode and said diaphragm of a first stream of raw water, each of said heads having a substantially centrally disposed opening therethrough surrounding the adjacent end of said anode and communicating with the adjacent end of said anolyte chamber, an inlet fixture secured in liquid-tight relation to one of said heads in the opening therein, an outlet fixture secured in liquid-tight relation to the other of said heads in the opening therein, one end of said anode projecting to the exterior of said anolyte chamber through a hole provided in one of said fixtures, a packing gland carried by said one fixture in surrounding relation with said anode in order to maintain said anolyte chamber liquid-tight, a porous ion exchange bed arranged in said anolyte chamber and consisting essentially of a loosely packed mass of ion exchange material and characterized by both cation exchange and anion exchange, said inlet and outlet fixtures accommodating the conduction through said anolyte chamber and through said bed and into contact therewith and into contact with both said anode and said diaphragm of a second stream of raw water, and means for applying a direct potential between said anode and said cathode so as to effect electrodialysis of said two streams of raw water, whereby said first stream of raw water is converted into an aqueous alkaline solution and said second stream of raw water is converted into an aqueous acid solution.

2. An electrolytic cell comprising an elongated tubular cathode, an elongated tubular permeable diaphragm arranged within said cathode in spaced relation therewith, an elongated anode arranged within said diaphragm in spaced relation therewith, a pair of longitudinally spaced-apart insulating heads respectively arranged in the opposite ends of said cathode and respectively abutting the opposite ends of said diaphragm, means including said cathode for retaining said diaphragm and said heads in compression in series relation, said heads cooperating with said diaphragm and said cathode and said anode to define a liquid-tight catholyte chamber between said diaphragm and said cathode and a liquid-tight anolyte chamber between said diaphragm and said anode, inlet and outlet conduits communicating with said catholyte chamber adjacent to the opposite ends thereof and accommodating the conduction therethrough and into contact with both said cathode and said diaphragm of a first stream of raw water, each of said heads having an opening therethrough surrounding the adjacent end of said anode and communicating with the adjacent end of said anolyte chamber, an inlet fixture secured in liquid-tight relation to one of said heads in the opening therein, an outlet fixture secured in liquid-tight relation to the other of said heads in the opening therein, one end of said anode projecting to the exterior of said anolyte chamber through a hole provided in one of said fixtures, a packing gland carried by said one fixture in surrounding relation with said anode in order to maintain said anolyte chamber liquid-tight, a porous ion exchange bed arranged in said anolyte chamber and consisting essentially of a loosely packed mass of ion exchange material and characterized by both cation exchange and anion exchange, said inlet and outlet fixtures accommodating the conduction through said anolyte chamber and through said bed and into contact therewith and into contact with both said anode and said diaphragm of a second stream of raw water, and means for applying a direct potential between said anode and said cathode so as to effect electrodialysis of said two streams of raw water, whereby said first stream of raw water is converted into an aqueous alkaline solution and said second stream of raw water is converted into an aqueous acid solution.

3. An electrolytic cell comprising an elongated tubular cathode, an elongated tubular permeable diaphragm arranged within said cathode in spaced relation therewith, an elongated anode arranged within said diaphragm in spaced relation therewith, a pair of longitudinally spaced-apart insulating heads respectively cooperating with the opposite ends of said diaphragm and said anode and said cathode to define a liquid-tight catholyte chamber between said diaphragm and said cathode and a liquid-tight anolyte chamber between said diaphragm and said anode, inlet and outlet conduits communicating with said catholyte chamber adjacent to the opposite ends thereof and accommodating the conduction therethrough and into contact with both said cathode and said diaphragm of a first stream of raw water, each of said heads having an opening therethrough surrounding the adjacent end of said anode and communicating with the adjacent end of said anolyte chamber, an inlet fixture secured in liquid-tight relation to one of said heads in the opening therein, an outlet fixture secured in liquid-tight relation to the other of said heads in the opening therein, one end of said anode projecting to the exterior of said anolyte chamber through a hole provided in one of said fixtures, a packing gland carried by said one fixture in surrounding relation with said anode in order to maintain said anolyte chamber liquid-tight, a porous ion exchange bed arranged in said anolyte chamber and consisting essentially of a loosely packed mass of ion exchange material and characterized by both cation exchange and anion exchange, said inlet and outlet fixtures accommodating the conduction through said anolyte chamber and through said bed and into contact therewith and into contact with both said anode and said diaphragm of a second stream of raw water, and means for applying a direct potential between said anode and said cathode so as to effect electrodialysis of said two streams of raw water, whereby said first stream of raw water is converted into an aqueous alkaline solution and said second stream of raw water is converted into an aqueous acid solution.

4. The electrolytic cell set forth in claim 3, and further comprising a perforated insulating tube surrounding said anode and preventing electrical contact thereof with said one fixture.

5. The electrolytic cell set forth in claim 3, wherein said one fixture includes a longitudinally extending hollow body through which said one end of said anode projects to the exterior and a laterally extending connecting hollow arm accommodating the conduction therethrough of said second stream of raw water.

6. The electrolytic cell set forth in claim 3, wherein said ion exchange bed consists essentially of a resinous condensation product carrying both exchangeable positive ions and exchangeable negative ions.

7. An electrolytic cell comprising an elongated tubular cathode, an elongated tubular permeable diaphragm arranged within said cathode in spaced relation therewith, an elongated tubular perforated insulating element arranged within said diaphragm in spaced relation therewith, an elongated anode arranged within said element in spaced relation therewith, a pair of longitudinally spaced-apart insulating heads respectively cooperating with the opposite ends of said diaphragm and said element and said cathode and said anode to define a liquid-tight catholyte chamber between said diaphragm and said cathode and a liquid-tight anolyte chamber between said diaphragm and said anode, said anolyte chamber being disposed on both sides of said element, inlet and outlet conduits communicating with said catholyte chamber adjacent to the opposite ends thereof and accommodating the conduction therethrough and into contact with both said cathode and said diaphragm of a first stream of raw water, each of said heads having an opening therethrough surrounding the adjacent end of said anode and communicating with the adjacent end of said anolyte chamber, an inlet fixture secured in liquid-tight relation to one of said heads in the opening therein, an outlet fixture secured in liquid-tight relation to the other of said heads in the opening therein, one end of said anode projecting to the exterior of said anolyte chamber through a hole provided in one of said fixtures, a packing gland carried by said one fixture in surrounding relation with said anode in order to maintain said anolyte chamber liquid-tight, a porous ion exchange bed arranged in said anolyte chamber between said diaphragm and said element and consisting essentially of a loosely packed mass of ion exchange material and characterized by both cation exchange and anion exchange, said inlet and outlet fixtures accommodating the conduction through said anolyte chamber and through said bed and through said element and into contact with said bed and into contact with both said diaphragm and said anode of a second stream of raw water, and means for applying a direct potential between said anode and said cathode so as to effect electrodialysis of said two streams of raw water, whereby said first stream of raw water is converted into an aqueous alkaline solution and said second stream of raw water is converted into an aqueous acid solution.

8. The electrolytic cell set forth in claim 3, wherein said cathode is formed essentially of stainless steel and said anode is formed essentially of a noble metal.

References Cited in the file of this patent

UNITED STATES PATENTS

| | | |
|---|---|---|
| 1,020,001 | Van Pelt | Mar. 12, 1912 |
| 2,788,319 | Pearson | Apr. 9, 1957 |
| 2,812,300 | Pearson | Nov. 5, 1957 |
| 2,854,394 | Kollsman | Sept. 30, 1958 |

OTHER REFERENCES

Walters et al.: Industrial and Engineering Chemistry, vol. 47, No. 1, January 1955, pages 61 to 64.